United States Patent [19]

Parks

[11] 4,420,525

[45] Dec. 13, 1983

[54] THIN DECORATIVE CEMENTITIOUS VENEERS AND A METHOD FOR MAKING SAME

[76] Inventor: David M. Parks, 119 Colonial Rd., Great Neck, N.Y. 11021

[21] Appl. No.: 347,999

[22] Filed: Feb. 11, 1982

[51] Int. Cl.³ .......................... B32B 3/00; B29C 9/00

[52] U.S. Cl. .................................... 428/156; 264/79; 264/86; 264/245; 264/247; 264/256; 264/257; 264/295; 264/333; 264/338; 428/220

[58] Field of Search ............... 264/245, 225, 256, 257, 264/247, 246, 333, 87, 79, 295, 338; 428/156, 220

[56] References Cited

U.S. PATENT DOCUMENTS

| | | | |
|---|---|---|---|
| 534,664 | 2/1895 | Polivka | 264/245 X |
| 1,888,492 | 11/1932 | Dearden | 264/245 X |
| 2,147,770 | 2/1939 | Ford | 264/245 X |
| 2,629,135 | 2/1953 | Johnson | 264/256 X |
| 2,689,381 | 9/1954 | Terriere | 264/256 X |
| 3,306,956 | 2/1967 | Barnette | 264/241 X |
| 3,646,181 | 2/1972 | Galla | 264/256 X |
| 3,904,723 | 9/1975 | Prince | 264/79 X |
| 4,335,065 | 6/1982 | Ando | 264/87 |

FOREIGN PATENT DOCUMENTS

| | | | |
|---|---|---|---|
| 519888 | 5/1953 | Belgium | 264/245 |

*Primary Examiner*—Donald E. Czaja
*Assistant Examiner*—James C. Housel
*Attorney, Agent, or Firm*—Edith Grill

[57] ABSTRACT

Novel thin flexible decorative colored cementitious veneers of about 5 to 60 mils in thickness, useful in wall coverings, floor coverings and on ceilings; and methods of producing said thin decorative cementitious veneers wherein printing, embossing and casting are performed simultaneously. The basic method comprises the steps of placing a wet cloth on a mold engraved with a design followed by placing a plastic cement mix on said wet cloth to simultaneously form a casting and a temporary cloth mold which is the exact copy of the original mold, immediately removing the plastic cement casting together with the temporary cloth mold from the original engraved mold before it sets, thereby making the original mold immediately available for the next casting, removing the temporary cloth mold from said plastic cement casting before it sets, and air curing said casting while being stored.

16 Claims, 8 Drawing Figures

THIN DECORATIVE CEMENTITIOUS VENEERS AND A METHOD FOR MAKING SAME

DESCRIPTION OF THE PRIOR ART

The present invention relates to novel thin flexible decorative cementitious veneers of about 5 to 60 mils thickness, methods of producing said veneers and their uses in wall coverings such as wallpaper, floor coverings, and ceiling decorations.

Hydraulic cement has long been used as a decorative material capable of serving as a superior wearing surface. Until recently, however, it has been necessary to cast cement in thick sections as shown in U.S. Pat. Nos. 957,188, 1,557,748, 1,641,553, and 2,288,559. Metal reinforcement reduces the thickness required but its placing and protection require thicknesses greater than one or two inches. The use of fiber reinforced cements or the use of latex modified cements makes possible the casting of cement sections in thicknesses less than ¼", but the need for the cement panel to be self-supporting generally results in castings greater than ¼".

U.S. Pat. No. 4,213,926 prepares a decorative cementitious panel from a transfer sheet having a printed pattern thereon, resulting in a panel of an ultra thin thickness of 3.2 mm (column 11 line 40) which is equivalent to 128 mils; said panel being applicable to prior precast concrete plate having a thickness of 150 to 180 mm which is equivalent to 6 to 7.2 inches. U.S. Pat. No. 3,206,527 also utilizes the method of a transfer sheet carrying the design which is imprinted onto the surface of a thin layer of aqueous gypsum plaster slurry while the plaster is in a physically impressionable form.

U.S. Pat. No. 4,055,322 discloses a method of producing textured patterns on concrete by an etching process on the concrete surface, using a water permeable membrane having a pattern on one side of said membrane, delineated by a water soluble retardant which retards setting of the cement. The resulting patterns are not colored, merely textured.

U.S. Pat. No. 4,254,077 relates to a method of making decorative inlaid concrete blocks suitable for use as floor or patio tiles, using two separate charges of concrete of different degrees of wetness, pouring the first charge of colored wet concrete into a form of the inlaid pattern and permitting the concrete to cure for 12 to 24 hours before removing said form, followed by pouring the second differently colored wet concrete into a second form surrounding said pattern and permitting to cure for 12 to 24 hours before removing this form.

U.S. Pat. No. 3,833,703 relates to the fabrication of wall or floor coverings of 2 mm thickness which is approximately 80 mils, made of flexible synthetic materials having a dual layered construction, which comprises applying a first liquid mass of a hardenable polyester mixture into the depressions of a molding band, gelling said mass by means of heat, and applying to the first gelled tacky cooled mass, a second mass of a hardenable polyester mixture, hardening the two-layered material at elevated temperatures and removing from said molding band.

However, there is no disclocure of thin decorative colored cementitious veneers of about 5 to 60 mils thickness produced by simultaneously forming a decorative cement casting and a temporary cloth mold which is the exact copy of the original mold design, consecutively removing the plastic cement casting from the original mold and from the temporary cloth mold before said casting sets, thereby making said molds readily available for succeeding castings, and allowing said cement castings to harden by air curing while being stored.

Many problems are encountered in the casting of thin cement sections. Even with the use of plastic molds, removal of the thin casting and subsequent handling often result in the destruction of the casting. Furthermore, it is necessary to produce many molds and employ expensive curing procedures such as 24 hour steam curing, if a reasonable production schedule is to be maintained. Also, set-up costs and mold costs preclude the production of small quantities of unique or special designs at reasonable prices. The present state of the art to produce decorative cementitious veneers is not encouraging as regards production and costs.

It has been found that the casting of thin decorative multi-colored cementitious veneers in accordance with present invention does not require expensive machinery or equipment. There are no curing costs. The castings are air cured, neither moisture nor steam curing is necessary. Mold costs are at a minimum since only one mold is required for any number of castings. The model itself could also serve as the mold. The model could be taken directly from nature or from an existing low relief designed article or material. This invention permits profitable production of castings having unique or special designs since mold costs are low and there are no added set-up costs. The cost of making molds and castings in accordance with this invention is economical and does not require large capitalization or heavy overhead costs. This enables small firms to meet the particular needs of the buyer as regards design, production, and price; and permits creativity in colors and textures in the use of decorative cementitious veneers.

Furthermore, the advantage of a cement wearing surface is that the cement surface need not be thick. Many decorative wearing surfaces such as paint, wallpaper, floor coverings, and veneers rely on a decorative finish that is only several mils in thickness. A decorative cement wearing surface 15 to 30 mils thick (approximately 1/64" to 1/32") satisfies the requirements of most wearing surfaces.

SUMMARY OF THE INVENTION

Accordingly, it is a primary object of the present invention to provide thin, decorative, colored cementitious veneers to be used in building structures such as walls, floors or ceilings, wherein said design extends the full depth of the veneer.

Another object of present invention is to provide a multicolored decorative cementitious veneer of about 5 to 60 mils thick.

Still another object of the invention is to provide a novel process especially suitable for the continuous operation of making decorative cementitious veneer castings by removing the casting from the mold immediately upon casting and prior to curing.

Another object of the invention is to provide an economical method of producing flexible thin cementitious products having a hard tough and durable wearing surface.

Still another object of this invention is to provide a process of simultaneously forming a decorative cement casting and a temporary cloth mold which is the exact copy of the original mold design.

Additional objects, advantages and novel features of the invention will be set forth in part in the description which follows, and in part will become apparent to those skilled in the art upon examination of the following or may be learned by practice of the invention.

To achieve the foregoing and in accordance with the purpose of the present invention, as embodied and broadly described herein, the novel thin decorative multicolored cementitious veneer castings of this invention are about 5 to 60 mils thick with the decorative pattern, design or picture extending the full depth of the veneer, and which exhibit a hard tough durable wearing surface, are flexible and can be wound into a roll-shaped configuration, and capable of being shaped while plastic into any form or shape, said cement castings having utility in building structures for the lining or covering of walls, floors and ceilings. As the cement wears, its character does not change, nor will the design be lost since the colored design runs through the full thickness of the design. The thickness required to sustain anticipated wearing is different for different locations and use. An interior ceiling may receive no wear whatsoever, so that its wearing surface need only be as thick as that necessary to affect the design desired. For example, a ceiling cameo design need only be 10 mils thick to create its effect. On the other hand, the wearing surface for an exterior walkway, in relief design, might be 100 to 200 mils thick.

A method of making the thin decorative multicolored cementitious veneer products of present invention generally comprises the steps of placing a wet cloth on a mold engraved with a design, simultaneously forming a cement casting and a temporary cloth mold which is the exact copy of said mold by placing a first layer of colored plastic cement mix on said wet cloth and forcing said cement mix into the incised portions of the engraving, placing a second layer of a differently colored plastic cement mix on said first cement layer, immediately removing said plastic cement casting together with the temporary cloth mold from the engraved mold before it sets, removing the temporary cloth mold from said plastic cement casting before it sets and storing said plastic casting until it sets by air curing. It is additionally desirable to compact the first layer of plastic cement prior to the addition of the second layer, and to compact the second plastic layer of cement prior to removal of the plastic casting from the original engraved mold in order to remove the excess water from the cement layers. It is additionally preferred to place a thin plastic sheet such as a polyethylene sheet over the entire plastic cement casting to facilitate removal of said casting from the original engraved mold. After removal of the temporary cloth mold from the plastic cement casting, it is preferred to place a thin flat plastic sheet such as a polyethylene sheet over the uncovered surface of the plastic cement casting so that said casting is sandwiched between two polyethylene sheets to facilitate storage until cured. Said polyethylene sheets are readily removable from the hardened or cured casting prior to, or at the site of installation.

The use of a temporary cloth mold copy to produce a cement casting permits the use of any low profile model as the permanent model mold. A model having an intaglio design will produce a casting having a cameo design and vice versa. The thickness of the cameo design is determined by the depth of the depressions of the intaglio design. If the veneer casting is to have the exact design of the model, then a casting would be made of the model and this casting would serve as the permanent mold from which veneer castings will be produced as exact copies of the model, including position as well as relief.

For effective use and reuse of a model as a permanent model mold, it should be of sturdy construction and be water repellent. Some models such as soap carvings or carvings in organic materials are not water repellent nor of sturdy construction. Such models can be reproduced by way of cement castings, and the castings which are water repellent and strong will serve as permanent molds. Other moldels may be made water repellent by applying an acrylic coating. This invention permits the use of a model as a mold without any damage to the model. Any article or material (man-made or as found in nature) having a low profile relief design may be used as a mold when the temporary cloth mold copy is used. There are any number of ways in which models may be constructed to serve as permanent molds for use with the cloth copy. Suitable examples are linoleum or wood cuts, plaster, cement, or metal castings, cut glass; wood, soap, clay, or wax carvings; embossed paper, cardboard, or leather; textured paintings; glues or pastes applied to produce relief designs; paper, cardboard, rubber, or plastic cut-outs (built-up if necessary); or any material arranged to produce a relief design and made water repellent.

More specifically, the sequence of steps utilized in the production of the thin decorative multicolored cementitious veneer products comprises:

providing at least one waterproof mold with an engraving having an intaglio design;

placing an overhanging flat wet cloth on the engraved mold;

forcing a colored plastic hydraulic cement mix into the incised portions of the engraving which embosses the wet cloth so that it becomes a temporary cloth mold;

compacting the cement by pressing absorbent paper towels into the cement to absorb the excess water, and wiping clean the flat portions of the intaglio design;

placing a second colored hydraulic cement mix on the entire flat surface of the design and compacting the cement by pressing absorbent paper towels into the cement to absorb the excess water;

applying an overhanging flat thin polyethylene sheet to the entire plastic cement casting, whereby said plastic cement casting is sandwiched between the temporary cloth mold and the polyethylene sheet;

immediately removing the plastic cement casting prior to setting, from the engraved mold by means of said overhanging cloth and polyethylene sheet and placing said plastic casting on a firm surface with the temporary cloth mold facing up;

immediately removing the temporary cloth mold from said plastic casting prior to setting;

applying a thin flat polyethylene sheet to the top surface of the plastic cement casting; and storing the plastic cement casting sandwiched between two sheets of polyethylene until it air cures.

The plastic casting may be subjected to compression by means of a roller or similarly suitable means while sandwiched between the temporary cloth mold and the polyethylene sheet to remove additional water from the plastic casting. Similarly, compression may be applied to the plastic cement casting while sandwiched between two polyethylene sheets to reduce the relief design if desired.

The plastic cement casting sandwiched between two polyethylene sheets may be shaped while still plastic into a permanent form or shape by placing around a shaped form, such as draping over any suitable form such as a wood plank and permitting said casting to harden thereon, thereby creating a permanent channel. After said plastic cement casting hardens into a permanently shaped decorative cementitious veneer, such as a channel, the inside polyethylene sheet is removed and said channel can be filled with perlite cement or other light material to yield a decorative lightweight cement plank.

In lieu of using a single engraved mold to produce the decorative cement veneers of present invention, multiple molds, one for each color of a composite design, may be used. The separately cast plastic or hardened colored cement veneers are combined and assembled in their respective positions, using a polyethylene sheet printed with the outlines of all the colors as an assembly guide.

Another method of producing multicolored designed cementitious veneers utilizes the initial preparation of a design with colored granules on a tacky sheet wherein one side of a plastic sheet is coated with adhesive, and transferring said colored granular design to a plastic cement veneer, by impressing the granular design onto the plastic cement veneer, whereby the colored granules are firmly embedded into the surface of the thin cement veneer when it hardens. The granules used in this process may be cement, colored sand, metal fillings, flocked fabrics and the like. The sheet of granular design may be dried and used as a model mold for making thin cementitious veneer castings in two or more colors by using the temporary cloth mold method. It is preferred that the granules be not less than 30 mils in order to provide a suitable relief designed mold for casting the thin decorative cementitious veneers.

The thin decorative cementitious veneers of present invention may also be cast in a model mold lined with a sheet of aluminum foil which will assume the exact shape of the intaglio design, similarly to the temporary cloth mold. However, the aluminum foil remains permanently affixed to the cement casting and also provides a finished protective surface. After the cement is forced into the depressions of the intaglio design, and compacted by means of water absorbent paper and the action of a roller, a backing sheet which adheres to the cement is placed over the dense compacted cement. The backing sheet may be a fabric netting or paper or any other material which will adhere to the cement. Immediately upon placing the backing sheet on the plastic cement casting, said plastic cement casting is encased between a backing sheet and the aluminum foil, and is removed from the model mold making said mold immediately available for the next casting. It may be necessary to coat the entire surface of the backing material with an adhesive that will bind the aluminum surface with the backing material.

The colored hydraulic cement mix utilized in present invention includes any cement containing composition which sets and cures to a hard mass when combined with water. The cement may be any compound or mixture of compounds, usually calcareous (limestone, marl or chalk) and argillaceous (clay or shale, $Al_2O_3.SiO_2$) which interact with water to form a cohesive, solid product. Representative of such cement forming materials are natural cement, Portland cement, magnesite cement, aluminous cement, slag cement and the like. Preferred for use in the method of the present invention are hydraulic cements such as Portland cement.

The cement compositions employed in the method of the invention may also contain filler materials such as gravel, sand, ground marble dust, clay cinders, slag and like fillers which are conventionally termed "aggregate". The aggregate is encapsulated in the matrix of cement and when the mixture is combined in conventionally employed proportions with water, there is initially formed a slurry which may be molded. The slurry sets or cures due to complex chemical reactions to form a hard, solid, unified mass.

In addition to aggregate, other conventionally employed ingredients may be present in the cement compositions. Illustrative of such additional ingredients are reinforcing fillers such as fibrous material exemplified by fibers of glass, steel, nylon and the like, animal hair, spun fibers and like materials; surface active agents, pigments, polymeric resin binders such as acrylic polymers, water repellents, cure accelerations or retarders, air-entrainers, plasticizers and the like.

The pigments are preferably fast to ultraviolet light, stable and water insoluble when the casting has been cured. Pigments may be natural or inert colors or synthetic materials. The amount of pigment preferably does not exceed about 10% by weight of the cement. The percentage of solids of the acrylic polymer emulsion is preferably between about 5 and 20% by weight of the cement. A workable mix that is smooth and creamy, preferably has a water-cement ratio of 40%. A paint solution consisting of pigment, an acrylic polymer, and water is stable and has a shelf life of many years. Such paint solutions may be produced in large quantities and stored for future use to be mixed with the cement as needed. The paint solution and the white or gray cement is mixed by hand or mechanically mixed for two to four minutes. The mix should be smooth and creamy.

The use of acrylic modifiers in the cement results in a wearing surface that is hard tough and durable. Such a cement wearing surface is resistant to fire, water, and ultraviolet light. The cement wearing surface is not affected by the many chemicals wearing surfaces often encounter. Nor, will cleaning detergents, rubbing, scrubbing, or even sanding change the design or character of the cement wearing surface. The wearing surface may extend below or at grade without danger of rot, dampness, or insect infiltration, including termites. Interior floors may be waxed or coated with an acrylic to enhance their appearance and prolong the intervals of cleaning. Exterior cement wearing surfaces may rely upon the wind, rain, or snow for its cleaning action.

BRIEF DESCRIPTION OF THE DRAWINGS

The invention is explained and illustrated in greater detail with reference to the accompanying drawings which illustrate preferred embodiments, but are not intended to limit the invention in any way.

DETAILED DESCRIPTION OF THE INVENTION

The invention will be explained in greater detail in conjunction with the drawings, which is given by way of illustration, and is not limited thereto.

Figure 1:
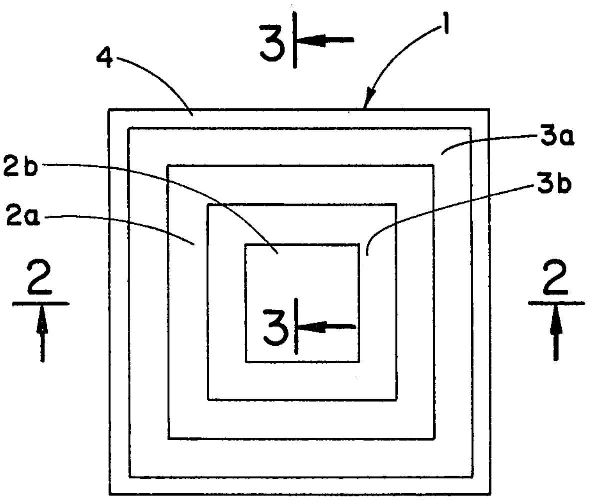
FIG. 1 is a plan view of a model mold engraved with an intaglio design, used in the production of thin multicolored decorative cementitious veneers in accordance with this invention.
Figure 2:
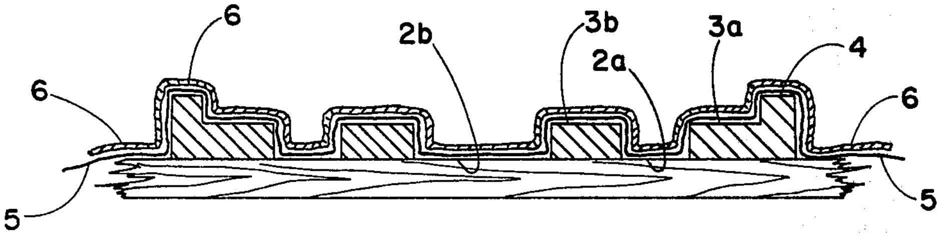
FIG. 2 is a cross-sectional view along line 2—2 of FIG. 1 of the mold, on a firm support after the initial step of placing a wet cloth on the mold.

A water repellent permanent model mold 1, as shown in FIGS. 1 and 2, engraved with an intaglio design, wherein *2a* and *2b* represent the depressions or incised portions of the design, *3a* and *3b* represent the flat surfaces of said design, and 4 represents the edge screed is sprayed with water, and a dry piece of paper 5 greater in size than the entire design is placed over the wet mold 1 and shaped to assume the shape of mold 1 as shown in FIG. 2. The paper need not fully be shaped to the contours of mold 1, but sufficiently shaped to eliminate wrinkles and visible air pockets. The paper may also be sprayed with water to facilitate the shaping of the paper into mold 1.

Figure 5:
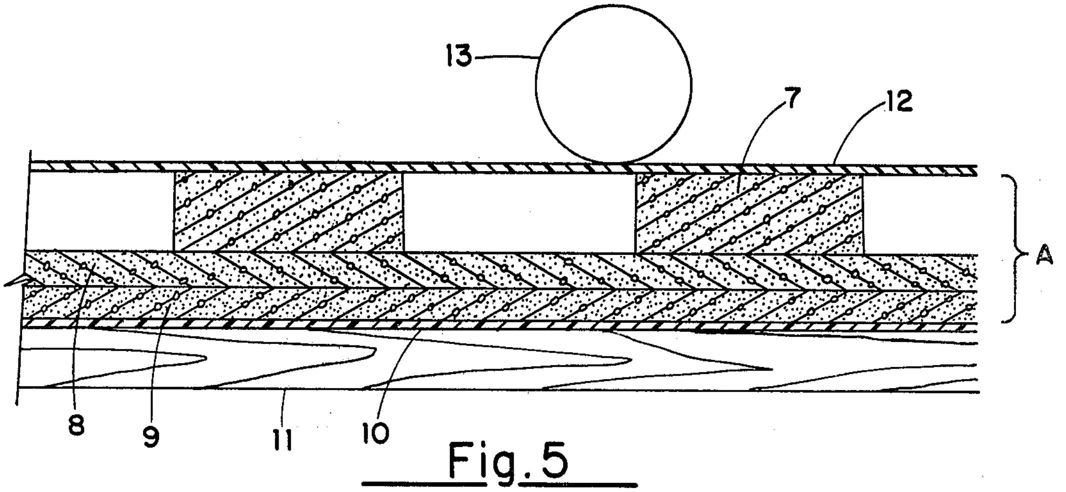
FIG. 5 is an exploded cross-sectional view showing the cement casting sandwiched between two polyethylene sheets after removal of the temporary cloth mold resting on a firm support.

A flat wet cloth 6, greater in size than the entire design, is placed over the paper 5 as shown in FIG. 2 and worked into mold 1 so that it is level, smooth and without wrinkles. The cloth 6 used to make the temporary cloth mold must perform as follows: when wet it must be sufficiently pliable to take the exact shape of the permanent mold 1; it must not permit the passage of cement to the permanent mold 1; it must be strong and tough when wet so that it may be handled in its removal from the permanent mold 1 and in its separation from the plastic casting A (FIG. 5). Prior to placing the wet cloth 6 upon the permanent mold 1, the mold is made wet with water and a piece of dry paper 5 is placed upon the wet permanent mold 1. The paper 5 is sprayed with water and spread smooth and level without wrinkles or visible air pockets. The wet paper 5 causes the wet cloth 6 to cling to the permanent mold 1 so that it does not shift or move during the cementing process or when cement is removed from the flat surfaces *3a* and *3b*. Both the paper 5 and the wet cloth 6 are wide enough to overhang the design. The wetted cloth 6 is placed upon the wet paper 5 and with a soft brush, sponge, or by hand (rubber gloves having a knurled surface) the cloth 6 is worked into the depressions *2a* and *2b* of the mold 1 while at the same time wrinkles or trapped air are removed. The wet cloth mold 6 now assumes the general shape of the permanent mold 1. The cloth 6 will become an exact copy of the permanent mold 1 by the method of applying the plastic cement mix 7 to the mold. A most satisfactory cloth is sateen, a cotton cloth, or umbrella cloth having a cotton wrap and a silk, rayon, or nylon filling. A pima cotton cloth is also satisfactory. Silk is good for very fine detail. The cotton cloth is strong and durable and may be reused many times. After the cloth 6 is removed from the plastic casting A, it is rinsed and washed in plain water and while still wet it is immediately ready for reuse as a temporary mold. A temporary paper mold is satisfactory if it meets the requirements as noted above. When paper is used as the temporary mold or when the paper is to be left in place to dry with the casting, the paper may be placed upon a wet cloth that was previously placed upon the permanent mold in the same manner as was the wet paper before the cloth was placed upon the wet paper. When the paper is left in place to dry with the casting, it becomes most difficult to remove the paper which may be desirable at times, i.e., in the fabrication of a wallpaper having a decorative cementitious veneer.

Figure 3:
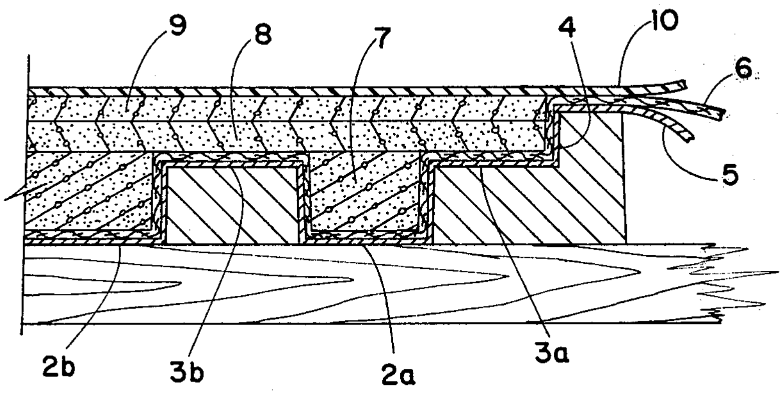
FIG. 3 is an exploded view on line 3—3 of FIG. 1 showing the first layer of colored wet cement in the depressions or incised parts of the intaglio design and the second color cement placed in two layers.

A colored plastic hydraulic cement mix 7 is placed on the wet cloth 6 and forced into the depressions or incised portions *2a* and *2b* of the mold 1 as shown in FIG. 3, using any suitable means such as a spatula, thereby embossing the wet cloth so that it becomes a mold for the casting of a relief design. After the depressions *2a* and *2b* have been filled, the cement is cleared off the flat portions *3a* and *3b* of the design and the excess water is removed by placing absorbent paper towels over the wet cement layer 7 and using a rubber or sponge roller or a screened vacuum roller to press the absorbent paper into the wet cement 7, thereby making the cement 7 dense and compact. The wet absorbent towels are then removed with no loss of any cement, since only the excess water is absorbed by the absorbent paper towels. The wet paper towels are also used to wipe clean any of the first colored cement that may have been placed on the flat portions *3a* and *3b* of the intaglio design.

Immediately thereafter, a second colored cement mix is placed in two layers 8 and 9. The first layer 8 contains no fibers and is at least 10 to 15 mils thick. The second layer 9 contains fibers. The total thickness of both layers 8 and 9 is about 30 to 60 mils. Each layer is made dense and compact in the same manner as used with the first color. Removing excess water results in a dense, compact, yet plastic cement. The addition of a second color cement will not mix with the first colored cement when its excess water has been removed. Also the plastic casting with one or more colored cements that have had their excess water removed may be handled without falling apart, particularly, when the cements are sandwiched between two sheets.

A flat thin polyethylene sheet 10 larger than the casting A (a combination of 7, 8 and 9) is placed over the entire plastic casting A and worked into the casting A so that it makes full contact with the plastic cement surface 9. Both the wet cloth 6 and the thin polyethylene sheet 10 were placed so that each overhangs the permanent model mold 1. Both overhangs are held together and the plastic casting A sandwiched between the cloth 6 and the polyethylene sheet 10 is lifted off the permanent model mold 1. The permanent designed mold 1 now becomes available for the next casting.

Figure 4:
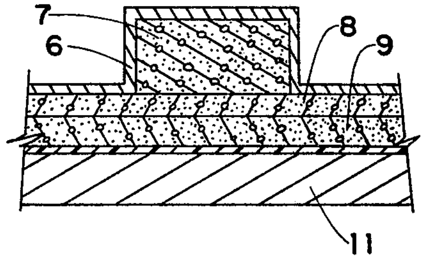
FIG. 4 is an exploded cross-sectional view similar to FIG. 3, showing the cement casting sandwiched between the polyethylene sheet and the temporary cloth mold, after removal from the mold.

The plastic casting A sandwiched between the embossed cloth 6 now acting as a mold for the plastic casting A, and the polyethylene sheet 10 is placed upon a firm flat surface 11, such as a flat sheet of plywood or thick plastic sheet, with the cloth 6 facing up, as shown in FIG. 4. A roller is passed over the cloth surface 6 to absorb additional water from the plastic casting A, and as such to decrease its bond with the plastic cement. Instead of using a roller on the cloth surface prior to removal, said cloth may be brushed or rubbed. Very little bond exists between the wet cloth 6 and the dense compacted plastic cement casting A so that it can readily be removed from the plastic casting A with little or no cement clinging to its surface. The pigment and water including some acrylic polymer which was added to the cement mix, does transfer to the wet cloth 6 and results in the cloth 6 being printed with the colors of the cement in the mirror image of the colored cement casting A. The cloth 6 remains embossed when it dries due to the acrylic polymer adhesive that was mixed into the cement mix.

After removal of the temporary cloth mold 6 which is now an embossed cloth print, the top surface of the plastic casting A is covered with a thin flat polyethylene sheet 12 as shown in FIG. 5. The polyethylene sheet 12 is worked into the plastic casting A so that it makes full contact with the surface of the plastic casting A. The plastic sheet 12 is preferably smooth and without wrinkles since the cured and hardened surface will have the same smoothness and evenness as the plastic sheet. The plastic casting A, now sandwiched between two sheets of polyethylene 10 and 12 may be stored until it air cures. When the casting has hardened, the polyethylene sheets 10 and 12 may be removed without effort and no cement whatsoever remains on the plastic sheets. Such removal may take place at the point of installation. The thin cementitious veneers may be stored, handled, packed and shipped with the polyethylene sheets attached. The polyethylene sheets affords protection to the surfaces of the thin veneer, does not damage the cameo design, and serves as additional reinforcement in handling the thin sections prior to installation onto a firm structural self supporting surface.

After seven days of air curing, the casting may be attached to another surface. Both sides of the casting will be smooth and have a waxed or polished appearance. Either plastic sheet may be removed for attachment of the cement surface to another surface. Attachment to another surface may be accomplished by either coating the other surface or the cement surface with a clear acrylic adhesive. The other surface could be wood, steel, glass, concrete, plaster, plaster board, or any surface that is compatible with an adhesive that is also compatible with the cement veneer casting. Although the thickness of such castings can be as thin as five to ten mils, the method can be employed to cast thicknesses ¼" or more. By laminating a number of such castings using an acrylic adhesive, thicknesses as great as one inch or more may be produced. Decorative grilles may be so produced. Such grilles are fire resistant, and water resistant for use indoors or outdoors.

When the casting is still plastic and sandwiched between the polyethylene sheets, it may be flattened with a roller 13 so that the relief is reduced or even entirely eliminated.

Figure 6:
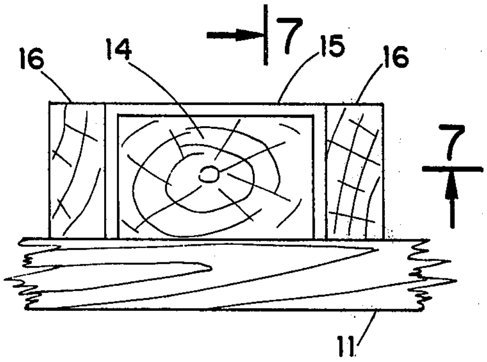
FIG. 6 is a cross-sectional view of the sandwiched plastic cement veneer draped over a form such as a wood plank to create a permanent form such as a channel.
Figure 7:
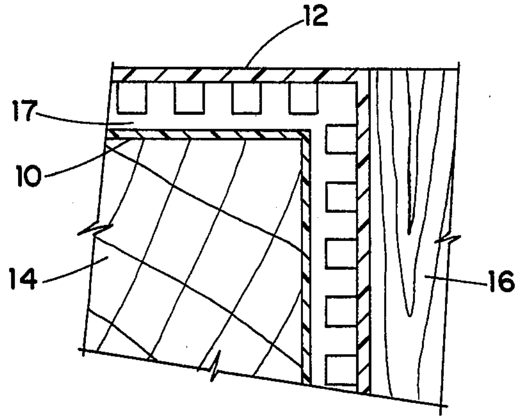
FIG. 7 is an exploded view on line 7—7 of FIG. 6, showing the plastic cameo design sandwiched between two sheets of polyethylene.

The plastic casting may be shaped to produce a mold or form as shown in FIGS. 6 and 7. Such a form or mold may be a complete object in itself or may be used as a permanent mold or form into which a plastic material can be placed. The plastic material may be structural concrete (reinforced or not) or light weight concrete weighing less than solid wood. An example would be to cast a design which simulates wood grain having two shades of color, by draping 15 (the plastic cement veneer sandwiched between two polyethylene sheets 10 and 12) over a piece of wood plank 14 such that the plastic casting covers the top and sides of the wood plank 14. The sides may be restrained by simply placing loose blocking 16 at the sides. When the plastic casting 17 hardens it can easily be removed from the wood plank 14 since the plastic sheets 10 and 12 will not adhere to the wood. A channel, is produced wherein perlite may be placed as a filler, after removal of plastic sheet 10 from the inside of this channel. When the lightweight perlite cement sets, a masonry plank which weighs less than an equivalent piece of wood, is obtained. This simulated wood plank may be placed directly upon the earth and it will not rot, decay, or be affected by termites or other insects. No maintenance is required for its appearance to remain unchanged.

FIGS. 8A through 8D illustrate the production of cementitious veneers with more than two colors. Each color requires a permanent model mold 101, 102, and 103 having an intaglio design corresponding to its particular color. After a differently colored cement is placed in the incised areas 104, 105 and 106 respectively and made dense and compacted as previously described, the excess cement on the flat areas of the temporary cloth mold is wiped clean. The cemented areas 104, 105 and 106 may optionally be coated with an acrylic gel adhesive medium which dries to a colorless, water resistant but not moisture resistant coating. Model mold 103 is screed for a background colored 103 casting. In a separate step, the outline of the full design is printed on several transparent plastic sheets such as polyethylene sheets 107, one for each color, using printing block 109 of FIG. 8D which contains the full design. The unprinted side of the printed polyethylene sheet 107 is placed over each coated plastic casting 104, 105 and 106 and is pressed into the casting using a roller or other suitable device. Each colored plastic cement veneer 104, 105 and 106 sandwiched between the temporary cloth mold and the printed polyethylene sheet 107 is removed from the model molds 101, 102 and 103 respectively, using the polyethylene and cloth mold overhangs, and placed on a firm support with the cloth mold facing up. The temporary cloth mold is removed from each plastic casting after using a roller thereon to express additional water from the castings. Each plastic colored cement casting without a top polyethylene sheet remains on the printed plastic sheet until assembled into the total design. In a like manner, a third, fourth, fifth, etc. colored cement casting may be produced.

The full design is assembled by placing plastic casting 104 with its imprinted plastic sheet 107 onto the background colored casting 106 to coincide with the design on the imprinted sheet 107, and pressing this casting 104 into background casting 106 with rollers or the like. The imprinted sheet 107 is removed and casting 105 with imprinted sheet 107 is similarly placed onto and impressed into background casting 106, but the imprinted sheet 107 is not removed, leaving the multicolored cementitious veneer casting to cure or set.

Figure 8A:
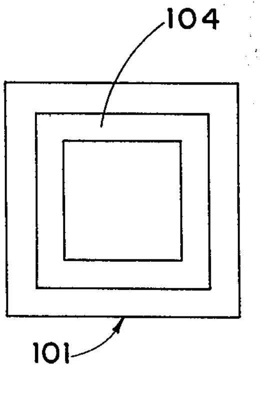
FIGS. 8A–D represents a plan view of a modified method of producing a multicolored decorative cementitious veneer having more than two colors, utilizing separate molds 8A, 8B and 8C for each color and assembling said separately colored veneers using printing block 8D which has the full design, and making copies thereof on the polyethylene sheets, as an assembly guide.
Figure 8B:
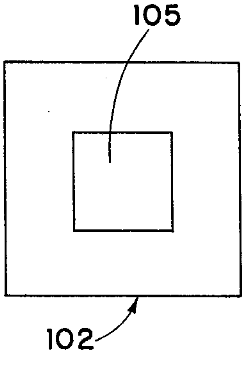
Figure 8C:
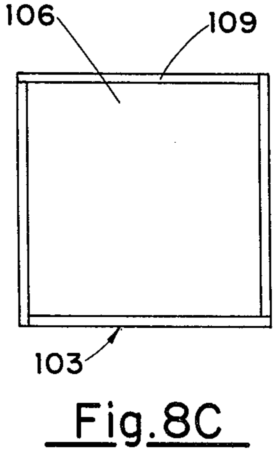
Figure 8D:
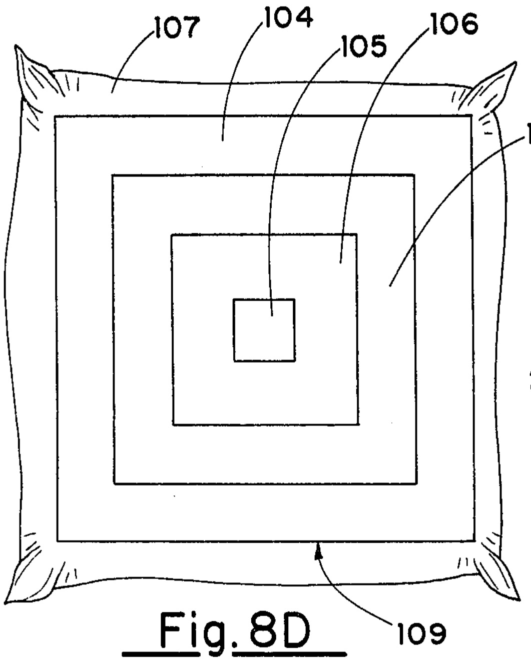

While these individual colored cement shapes can be transferred to any surface which is compatible with a clear water resistant adhesive (acrylic gel medium for example), it is preferable to select a surface resulting in a multicolored thin cementitious veneer. Such a surface is another cement casting having only one solid color, the background color. A thin cementitious veneer having one color can be produced in model mold 103 as shown in FIG. 8C or by spreading a cement mixture consisting of cement, water, coloring pigment, acrylic polymer and fibers (nylon or treated glass or polyester) on a polyethylene sheet resting firmly upon a support surface. The mixture may be spread by a combination vibrating table and rolled with the intervention of an absorbing paper between the plastic cement mix and the roller. When the desired thickness is obtained (not greater than 50 mils) the absorbent paper is removed and a cement mixture without the fibers is applied and spread as noted above. The thickness of this cement layer is preferably a maximum of 30 mils. The combined thickness of both layers is preferably not greater than 60 mils, with the top layer a minimum of 15 mils. The transfer of the colored cements can be made with all colors still plastic or when all colored cements have set and cured for at least 7 days, or with the background colored cement plastic and the other colored cements set and partly cured (at least 7 days).

The same procedure of transferring and assembling differently colored set cement castings to a plastic background casting can be utilized as in the assembly of separate plastic colored castings, which is fully described above. The set colored cement casting will adhere to the plastic background cement casting by impressing into the plastic background veneer casting and using a printed transparent plastic sheet of the composite design as an assembly guide.

To insure full transfer of separate plastic colored cement castings on a hardened background cement casting, said background casting is coated with an acrylic gel adhesive. Each colored cement casting is separately placed on the coated hardened background veneer and impressed into the background veneer by means of a roller or the like. The plastic sheet is removed and the next colored plastic casting is placed on the background veneer, until all the colored plastic cement castings are transferred to the background veneer. Additional coatings of acrylic gel may be necessary to maintain tackiness on the background veneer. Use is again made of the composite outline on the backs of the transparent plastic sheets to align the colors. The last sheet is left in place and a roller is passed over it to firmly place the colored cements into the adhesive coating.

In transferring set and hardened colored castings to a set and hardened background veneer, the same procedure is used as when transferring plastic colors to a hardened background, except that each colored face is also coated with a colorless adhesive, and the transparent plastic sheets cannot be removed as soon as the set casting is placed on the background casting. If the colored castings are very thin, it may be necessary to leave the transparent plastic sheet cover in place for only 10 to 15 minutes before transferring the next colored cement. The last sheet is left in place after it is rolled and is removed just prior to, or after installation onto the final surface.

A two color design, that is, the design in one color and the background in another color, can be produced as two separate colors from two model molds. The background color does not cover the entire area but appears only in areas not occupied by the design color. The polyethylene back sheets need not be printed since the colors may be put together by fitting the design color into the background color. This is possible since the colors are visible through the transparent polyethylene sheets holding the colored cement veneer. This results in a design without relief, but each color is distinctly separated from the other giving a very sharp picture. In this design the colors run through the material and can be viewed from either side. A two faced panel is thus created with the same picture on both sides, but a mirror image of each color.

Figure 9:
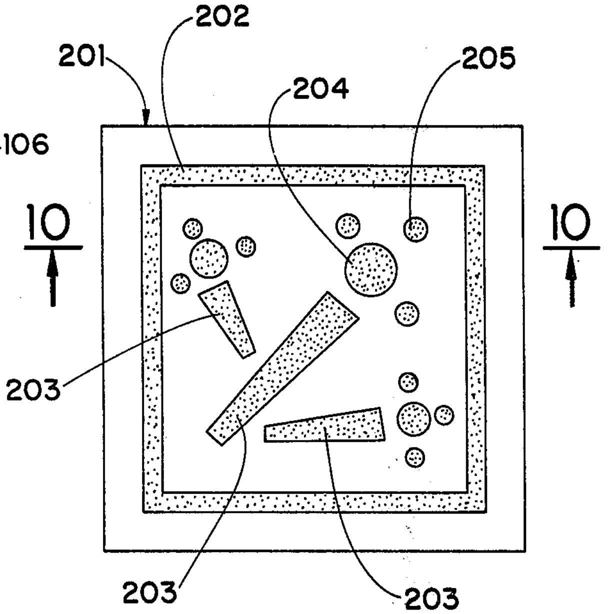
FIG. 9 is a plan view of a mold for making a colored design with colored granules.
Figure 10:
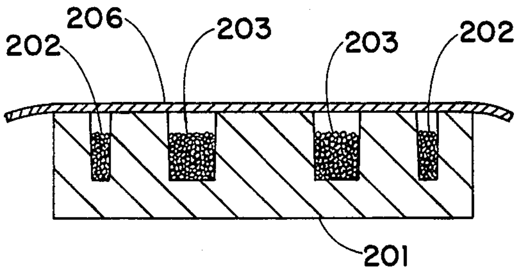
FIG. 10 is a cross-sectional view along line 10—10 of FIG. 9, with a tacky sheet on the top of said mold.
Figure 11:
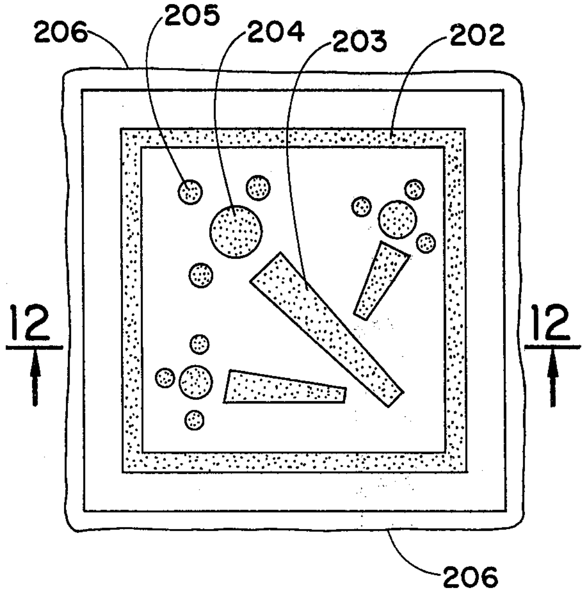
FIG. 11 is a plan view of the tacky sheet removed from the mold with the colored granular design.

FIGS. 9, 10, 11 and 12 illustrate the method of producing a multicolored design using a granule mold model 201, containing a grooved design. FIG. 9 is a plan view and FIG. 10 is a cross-sectional view of model mold 201 having differently shaped grooves containing colored granules 202 in a grooved border, differently colored granules 203 in an elongated grooved design and other colored granules 204 in large circular grooves and granules of a different color 205 in small circular grooves. A tacky sheet 206 which may be a paper, fabric or a plastic sheet such as polyethylene coated with a clear adhesive such as an acrylic or urethane composition, is placed over the top of the model mold 201 which is rotated 180 degrees. The colored granules make contact with the tacky surface of sheet 206 in exactly the same position they occupied prior to rotation. Mold 201 is rotated 180 degrees back and the colored granules fall back into their original grooves, leaving sufficient granules attached to the tacky surface to clearly and distinctly show a colored design of colored granules having the exact design as exists when the granules are at rest in their respective confined areas of the mold 201. A background colored granule 207 may be placed over the entire design. The granular surface may be coated with a clear acrylic or urethane composition to assure adhesion of the granules as well as to enhance the colors and provide a washable and water repellant surface. Tacky sheet 206 holds the granular design firmly in place which may be transferred to a plastic cementitious mix so that when the cement hardens, the granules are firmly embedded into the thin cement veneer. The granules may be cement granules, colored sand, metal fillings or flocked fabrics.

If the tacky sheet is a polyethylene sheet coated with an acrylic gel and the granules are cement granules, the polyethylene sheet is readily removable from the granular design and acrylic plastic binder, yielding a suitable wearing surface.

The use of cement granules embedded in a cement mix as noted above, results in a wearing surface suitable for interior flooring and exterior walls or walks. For interior walls and ceilings, the cement granules are useful in damp areas or for walls subject to heavy wear or abuse. However, for interior walls or ceilings, other granules may be employed in the use of this invention, such as colored sand, metal filings, or flocked fabrics. For a wall or ceiling covering, a tacky paper or fabric is employed, and the adhesive should be water insoluble when set. To insure the granules remaining in place, a clear coat of acrylic is preferably applied to the granules.

The granular design, using granules of at least 30 mils in diameter, may be utilized to create a model mold which can be employed to make thin cementitious veneer castings in two or more colors by using the temporary cloth mold method.

Figure 13:
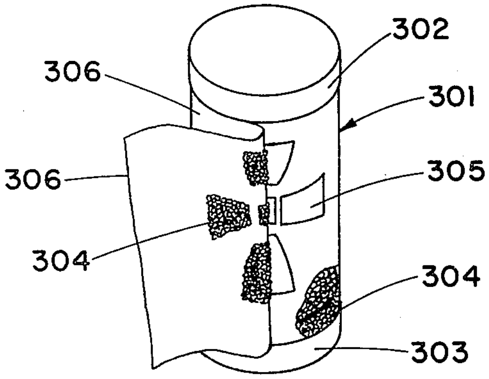
FIG. 13 is a perspective view of another mold for making a colored granular design on a tacky sheet.
Figure 12:
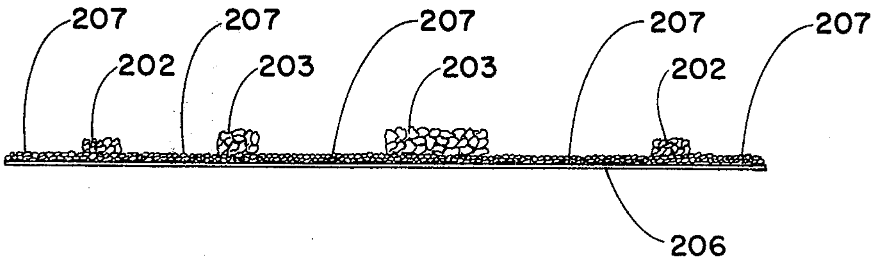
FIG. 12 is a cross-sectional view along line 12—12 of the tacky sheet with the colored granular design.

Another method of producing a multicolored granular design is illustrated in FIG. 13, wherein the granules are confined in a hollow heavy plastic cylinder 301 having a removable top cover 302 and a removable bottom cover 303. A design 305 is cut out along the circumference of the cylinder. The cutout 305 may be made on a flat thick plastic sheet and then shaped into cylinder 301 which is partially filled with granules 304 of the desired shape and size. A tacky sheet 306 is placed on the cut-out 305 and the cylinder is rotated back and forth once or twice so that the granules 304 pass over the cut-out area 305. The granules 304 will remain attached to the tacky sheet 306 only at cut-out 305. The tacky sheet 306 is removed and may be dipped into another size and color granule which provides a background granular color. The addition of background granules may be omitted. The sheet is permitted to dry. The granular design may be utilized as fully described above.

Figure 14:
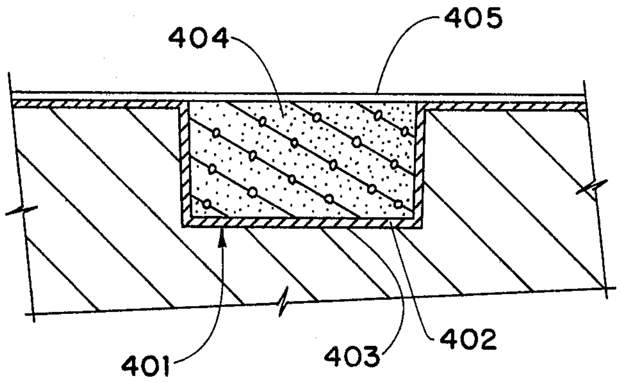
FIG. 14 is an exploded view of a cross-section of an encased casting of a thin cementitious veneer in a model mold.
Figure 15:
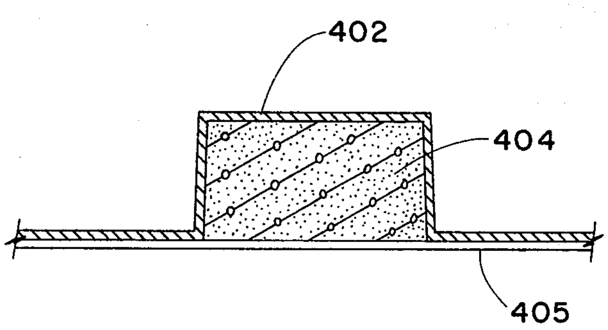
FIG. 15 is an exploded view of the encased cementitious veneer after removal from the model mold.

In lieu of making a temporary cloth mold for the purpose of creating a thin cementitious veneer casting, aluminum foil may be employed as a permanent mold that also provides a finished protective surface. A flat smooth sheet of aluminum foil 402 is placed on model mold 401 of FIG. 14, and is forced into the grooves 403 of an intaglio design, using a firm brush, spatula or by hand. The aluminum foil 402 assumes the exact shape of the intaglio design. As with the temporary cloth mold, the cement mix 404 is forced into the depressions 403. The aqueous cement mix contains about 1% by volume of fibers such as nylon, glass, steel or polyester fibers, and 5 to 10% acrylic polymer solids by weight of the cement. The cement 404 is made dense and compact with absorbent paper and a roller, as described in connection with the temporary cloth mold method. A backing sheet 405 is placed over the dense compacted cement 404. This sheet may be any material which remains attached to the cement, such as a fabric netting, cloth, paper, cardboard or burlap. Cement left on the flat portions of the design is removed. Depending upon the backing material 405 used and the cement area 404 in contact with the backing material 405, it may be necessary to coat the entire surface with an adhesive such as an acrylic gel medium, in order to bind the aluminum surface 402, to the backing material 405. Immediately upon placing backing material 405 in place, the plastic cementitious casting 404 encased between the aluminum foil 402 and backing 405 is removed from permanent model mold 401, as shown in FIG. 15, making said permanent mold available for the next casting. As produced, the aluminum foil mold can be used as a wall, ceiling, or floor covering.

The aluminum foil may have been painted prior to its use as a permanent mold and facing. If so, a two color effect may be obtained by removing all or some of the paint from the relief portions of the design. The paint may be removed by rubbing, fine sanding, or by applying a paint remover using a roller which makes contact with the relief surface only. The relief portion of the design may be painted a different color by the application of a roller over the relief portions. The cement mix may have been colored, so that upon abrading the relief portion, the colored cement becomes visible.

The aluminum foil mold method is a quick and easy way to produce a permanent relief design. A relief design can also be produced with a paper backing in lieu of the aluminum foil. A wet cloth is first placed upon the permanent mold and worked into place without wrinkles or air pockets. One surface of an absorbent paper such as newspaper is painted with an acrylic paint of a desired color. The painted side faces the wet cloth and does not receive the cement. The painted paper is placed on to the wet cloth and is worked into the wet cloth so that is is free of wrinkles or air pockets. The painted surface will serve as a background color while at the same time it makes the paper stronger and less likely to rupture or tear during the casting process or the removal from the permanent mold. Since the paper will remain attached to the hardened casting and the cement will not be visible, ordinary gray cement containing acrylic polymer solids and fibers may be used. In lieu of fibers, fabric reinforcing mesh or even perforated paper may be used. The reinforcement is employed to keep the cement casting in place after it is hardened and to serve as a backing material for attachment of the paper covered relief design to another surface. The plastic casting is removed from the permanent mold together with the wet cloth. In removing the plastic casting from the permanent mold, its weight is carried by the wet cloth and not the weak wet paper. After the casting is placed upon a flat firm surface having a plastic sheet surface, the wet cloth may be removed easily and with no difficulty. Similarly to the aluminum foil, the paper remains attached to the plastic casting and will remain so when the casting hardens.

After a week of curing, the casting may be handled for further treatment. The relief portion of the design may easily be painted a different color from the painted paper mold by the use of a paint roller which will only make contact with the relief portions of the casting. Prior to painting the relief portion, the entire paper covered casting may be given another coat of an acrylic paint. This coat of paint may result in providing the background color with a blend of two colors giving a shading effect.

The method employed in making a relief casting using aluminum foil as the permanent mold for the casting can be employed on existing designed relief objects to obtain a new model mold which will be used to make other castings. To exactly copy an original relief design, an aluminum faced reverse casting is easily made as herein already described. Then, using the aluminum faced casting as a model mold, thin cementitious veneered castings may be produced by using the temporary cloth method and an exact copy of the original is obtained.

The temporary cloth method of present invention makes it practical to cast only the joints which are necessary to connect and fill-in between tiles, bricks, marble, wood, or other materials which may be used for floors, walls, or ceilings. The thickness of such cement joints need not be thicker than required to insure wear and to approximate the thickness of the field material. Greater thicknesses can be obtained by laminating the thin veneer joints at the point of installation. The field material could also be a thin cement veneer to simulate another material or simply be decorative.

There are many advantages of precasting thin cement joints, such as greater control of joint layout. Corrections or adjustments in layout are facilitated. There is early visualization of layout before the field is in place, and rapid installation of the precast field. Precast joints may work in conjunction with other materials such as wood panels or stone panels. The joint arrangement can be intricate with many variable designs, yet its repetition is exact and easily controlled.

The joints are made up of a top layer of cement without fibers and the remaining thickness with fiber reinforced cement. The joints can be kept in large sections by a plastic backing sheet, or secured to fabric netting that is left in place. The joints, being thin and secured to a backing material can be rolled and shipped in large quantities. Since the field tile is also thin and similar in shape, large quantities can be shipped in small volumes.

EXAMPLE 1

A 15'×20' room, 300 square feet, using 1/16" 8"×8" tile veneer with a ½" wide joint would require the following:

13# of joint material delivered on a 6" round cylinder×3' wide (total thickness of cylinder roll 14" or two cylinders, each 10")

5 boxes of tiles, approximately 20# per box and each box not greater than 9"×9"×9" deep (135 tiles per box)

In lieu of precast joints, decorative grilles may also be produced by the method of using a temporary cloth mold and casting thin cementitious veneers. Again, greater thicknesses may be obtained by laminating layers using water resistant adhesives (such as an acrylic gel medium). Laminations could result in each side having a different color and texture. Such grilles would not require painting and would perform better than wood, steel, or aluminum.

Although the present invention has been described and illustrated with reference to specific embodiments, it is understood that modifications and variations thereof are contemplated within the scope of the following claims.

I claim:

1. A method of making a thin decorative cementitious veneer of about 5 of 60 mils thick which comprises the steps of:

providing at least one waterproof mold with an engraving having an intaglio design or pattern;

placing an overhanging wet cloth on the engraved mold;

placing a plastic hydraulic colored cement mix onto said wet cloth and forcing said cement mix into the incised portions of the engraving to simultaneously form a casting and a temporary cloth mold which is the exact copy of the original mold;

compacting said plastic cement, by removing excess water;

immediately removing said cement casting together with the temporary cloth mold from the engraved mold before it sets;

removing the temporary cloth casting from said plastic cement casting before it sets;

and storing said plastic casting unitl it sets by air curing.

2. The method according to claim 1, wherein a second or background layer of a differently colored plastic cement mix is placed on said first layer of compacted plastic cement, and compacting said second layer, prior to removing said dual colored plastic casting from the engraved mold.

3. The method according to claim 1, wherein the cement is compacted by pressing absorbent paper towels into the wet cement which absorbs the excess water and discarding the wet paper towels.

4. The method according to claim 1, including the additional steps of:

placing an overhanging thin, flat plastic sheet over the entire plastic cement casting, whereby said plastic cement is sandwiched between the temporary cloth mold and said plastic sheet;

removing said plastic casting from the engraved mold by means of said overhanging cloth and sheet; and placing said plastic casting on a firm surface with the temporary cloth mold facing up.

5. The method according to claim 5, including the step of applying a thin flat plastic sheet to the uncovered surface of the plastic cement casting after removal of the temporary cloth mold, so that said plastic casting is sandwiched between two plastic sheets, and allowed to set by air curing.

6. The method according to claim 5, wherein the plastic cement casting sandwiched between two plastic sheets may be shaped while still plastic into a permanent form by placing said plastic casting around a shaped form and permitting said casting to harden thereon.

7. The method according to claim 6, wherein the shaped form is a channel with a decorative cement veneer.

8. The method according to claim 5, wherein flexible thin cement joints are cast and cured comprising of a top layer of cement without fibers and a bottom layer of fiber reinforced cement, sandwiched between two plastic sheets.

9. The method according to claim 1, wherein the water-proof mold is a dried sheet with a colored granular design thereon, produced by:

placing differently colored granules in the grooves of a grooved mold;

covering the top of said mold with the adhesive covered side of a plastic sheet;

rotating said mold so that the colored granules make contact with and adhere to said sheet at designated areas; and drying said sheet of a colored granular design.

10. The method according to claim 9, wherein said granular design is impressed into a plastic cement veneer casting with the colored granules firmly embedded into the surface of said thin cement veneer.

11. A method of making a thin decorative cementitious veneer of about 5 to 60 mils thick which comprises the steps of:

providing at least one waterproof mold with an engraving having an intaglio design or pattern;

placing an overhanging sheet of aluminum foil on the engraved mold;

placing a plastic hydraulic colored cement mix onto said aluminum foil and forcing said cement mix into the incised portions of the engraving to form a permanent aluminum foil mold affixed to the cement casting, which is the exact copy of the original mold;

compacting said plastic cement, by removing excess water;

immediately removing said permanent aluminum foil mold and cement casting from the engraved mold before it sets;

and storing said plastic casting affixed to said aluminum foil until it sets by air curing.

12. The method according to claim 11, wherein a backing sheet is placed on the plastic cement casting which adheres to the cement casting to encase said plastic cement casting between said aluminum foil and said backing sheet, which facilitates removal of the cement casting from the model mold, and allows said encased casting to air cure.

13. The method of claim 12, wherein the cured aluminum encased casting can be used as a wall, ceiling or floor covering.

14. A method of making a thin decorative cementitious veneer of about 5 to 60 mils thick which comprises the steps of:

providing at least one waterproof mold with an engraving having an intaglio design or pattern;

placing an overhanging wet paper on the engraved mold;

placing a plastic hydraulic colored cement mix onto said wet paper and forcing said cement mix into the incised portions of the engraving to simultaneously form a casting and a temporary paper mold which is the exact copy of the original mold;

compacting said plastic cement, by removing excess water;

immediately removing said cement casting together with the temporary paper mold from the engraved mold before it sets;

leaving the temporary paper mold in place with the cement casting to set with the casting;

and storing said casting affixed to the paper until its sets by air curing.

15. The method of claim 14, wherein the set paper and casting can be used as a wall, celing or floor covering.

16. A thin decorative cementitious veneer casting of about 5 to 60 mils thick, with the decorative pattern, design or picture extending the full depth of the veneer, and is hard tough durable and flexible, and capable of being shaped while plastic into any form, made in accordance with the method of claim 2.

* * * * *